No. 699,041. Patented Apr. 29, 1902.
J. C. TURNIPSEED.
TRAP NET.
(Application filed Feb. 19, 1902.)
(No Model.)
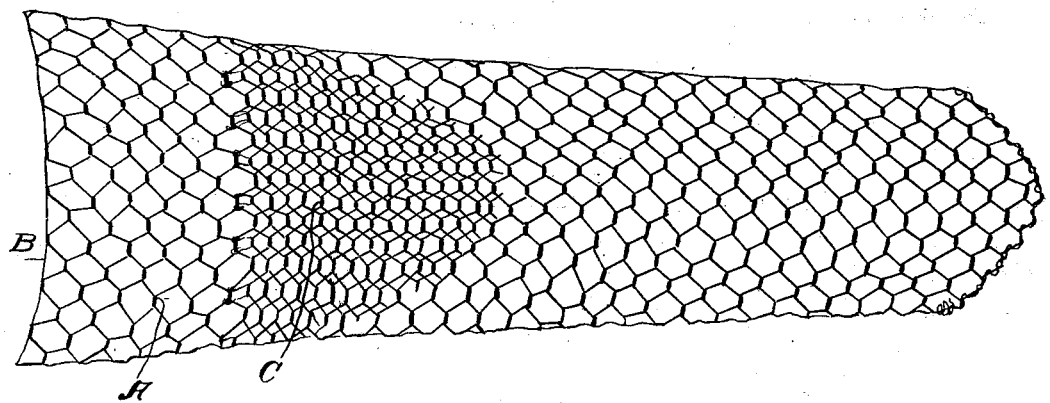
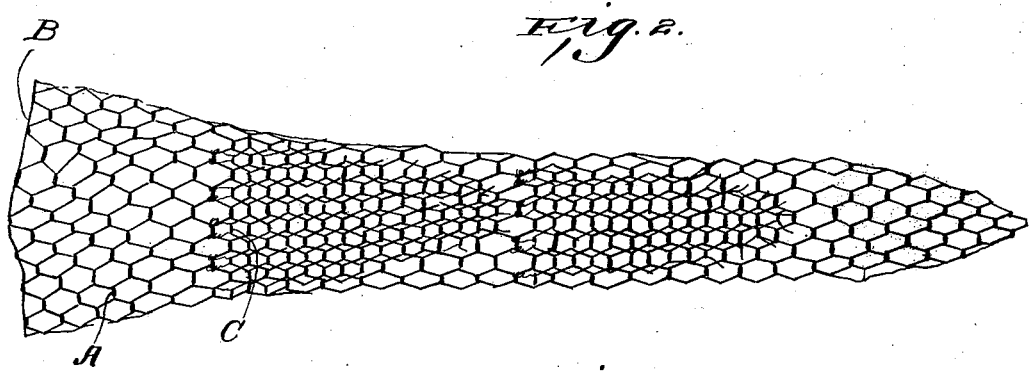
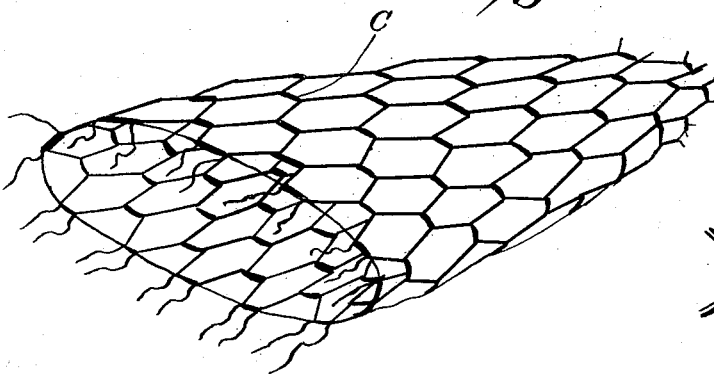
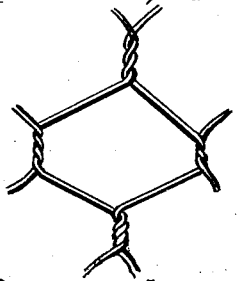
Witnesses:
R. A. Boswell
N. A. Mayhew
Inventor.
J. C. Turnipseed
By Wm. B. Matthews
Attorney.

UNITED STATES PATENT OFFICE.

JESSE C. TURNIPSEED, OF HAMPTON, GEORGIA.

TRAP-NET.

SPECIFICATION forming part of Letters Patent No. 699,041, dated April 29, 1902.

Application filed February 19, 1902. Serial No. 94,802. (No model.)

*To all whom it may concern:*

Be it known that I, JESSE C. TURNIPSEED, a citizen of the United States, residing at Hampton, in the county of Henry and State of Georgia, have invented certain new and useful Improvements in Trap-Nets; and I do hereby declare the following to be a full, clear, and exact description of the invention, such as will enable others skilled in the art to which it appertains to make and use the same.

This invention relates to certain new and useful improvements in fish-nets, and more particularly to that class of nets which are known as "trap-nets" and are designed for snaring fish and other water game.

The invention has for its object the provision of a cheaply-constructed, efficient, and thoroughly-reliable net or fish-trap constructed entirely of wire without employing framework of any kind.

The invention has for a further object the provision, in connection with fish traps or nets of this general character or type, of an improved form of gate or nozzle through which ready ingress to the trap is provided and which will after the entrance of the fish be automatically closed.

To these ends and to such others as the invention may pertain the same consists in the peculiar construction of the trap and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which drawings—

Figure 1 is a side view of a single trap embodying my invention. Fig. 2 is a like view of a double trap, and Fig. 3 is an enlarged detail in perspective showing one of the gates or nozzles. Fig. 4 is an enlarged detail view of one of the meshes of the net.

Reference now being had to the details of the drawings by letter, A designates the outer wall of the net or trap, which is made of wire, which is preferably galvanized. It will be noted that the form of the body portion of the trap is elliptical in cross-section, this form being selected in order to insure strength and rigidity without the use of hoops or framework such as has heretofore been used in the construction of trap-nets of this general type, and it will also be noted that the entrance or mouth B of the trap is made bell-shaped or flaring outwardly, this form of entrance serving both to increase the strength and rigidity of the structure and also to facilitate the entrance of fish to the trap.

The trap is provided with pringles C C, which are designed to permit of the ready ingress but effectually prevent the egress from the trap. These pringles C are each constructed of galvanized wire, each, as is the case with the body portion of the trap, being composed of wire-gauze bent into the required form and, like the body portion of the trap, is elliptical in cross-section.

In forming the pringle C the wire cloth or netting is formed into the elliptical and conical shape, and the small or inner end is left open, as shown in Fig. 3 of the drawings. The form of the pringle is such as to cause the opening at the smaller end of the structure to be normally held closed, or substantially, so by the elasticity of the wire and yet will readily yield to admit the fish to the trap.

In the double trap double nozzles or pringles are employed, the first being longer or larger than the inner or second in order that the fish may enter easily and be partly caged without experiencing any difficulty in entering.

In putting the trap together I preferably lace it with copper wire in order that the trap may without injury be allowed to remain for an indefinite length of time in the water.

The fish are removed from the trap by unlacing the end of the body portion, as will be readily understood.

Having thus described my invention, what I claim to be new, and desire to secure by Letters Patent, is—

1. A trap-net for fish, the same consisting of a body portion of wire-netting, bent to form a body portion elliptical in cross-section and having a flaring or bell-shaped entrance, in combination with one or more pringles, within the body portion, substantially as described and for the purpose specified.

2. A trap-net consisting of a body portion of wire-netting devoid of hoops, frames or other strengthening devices, the said body portion being elliptical in cross-section and having a flaring or bell-shaped entrance, in combination with one or more pringles made of wire-netting, said pringles being secured within the body portion and having at their contracted inner ends nozzles or passages normally held closed by the tension of the wire, substantially as described.

In testimony whereof I affix my signature in presence of two witnesses.

JESSE C. TURNIPSEED.

Witnesses:
 A. R. MARTIN,
 J. W. STEPHENS.